United States Patent [19]
Matsumoto et al.

[11] Patent Number: 5,659,254
[45] Date of Patent: Aug. 19, 1997

[54] CAPACITANCE TYPE SENSOR DEVICE

[75] Inventors: Masahiro Matsumoto, Hitachi; Seiko Suzuki, Hitachioota; Masayuki Miki, Hitachinaka; Masayoshi Suzuki, Hitachioota; Keiji Hanzawa, Mito; Takao Sasayama, Hitachi, all of Japan

[73] Assignees: Hitachi, Ltd.; Hitachi Automotive Engineering Co., Ltd., both of Japan

[21] Appl. No.: 455,712

[22] Filed: May 31, 1995

[30] Foreign Application Priority Data

May 31, 1994 [JP] Japan ................... 6-117913

[51] Int. Cl.$^6$ ................................... G01R 11/52
[52] U.S. Cl. ............... 324/678; 324/548; 73/514.32; 73/718; 73/724
[58] Field of Search .............. 330/9, 51; 73/514.32, 73/514.18, 718, 724; 324/678

[56] References Cited

U.S. PATENT DOCUMENTS

| | | | |
|---|---|---|---|
| 3,886,447 | 5/1975 | Tanaka | 324/678 |
| 4,531,106 | 7/1985 | Ganesan | 330/9 |
| 4,543,546 | 9/1985 | Hariharan | 330/51 |
| 4,644,304 | 2/1987 | Temes | 330/9 |
| 5,166,630 | 11/1992 | Lee | 330/9 |

FOREIGN PATENT DOCUMENTS 41 42 101 A1   6/1993   Germany .

OTHER PUBLICATIONS

An Autoranging Switched–Capacitor Analog–to–Digital Converter, Kazuyuki Kondoh et al., IEEE Transactions on Instrumentation and Measurement, vol. IM–36, No. 4, Dec. 1987, pp. 879–882.

Integrated Photocapacitive Position–Sensitive Detector Made in CMOS Technology, W. D. Schmidt et al., Sensors and Actuators A, 39 (1993), pp. 117–124 (month unavailable).

Integrated Silicon capacitive Accelerometer with PPL Servo Technique, Y. Matsumoto et al., Sensors and Actuators A, 39 (1993), pp. 209–217 (month unavailable).

A Voltage–Controlled Switched–Capacitor Relaxation Oscillator, Ken Martin, IEEE Journal of Solid–State Circuits, vol. SC–16, No. 4, Aug. 1981, pp. 412–414.

Low–Phase–Error Offset–Compensated Switched–Capacitor Integrator, W. H. Ki et al., Electronic Letters, vol. 26, No. 13, Jun. 21, 1990, pp. 957–959.

A Switched–Capacitor Charge–Balancing Analog–to–Analog Digital Converter and Its application to Capacitance Measurement, Hiroki Matsumoto et al., IEEE Transactions on Instrumentation and Measurement, vol. IM–36, No. 4, Dec. 1987, pp. 873–878.

*Primary Examiner*—Kenneth A. Wieder
*Assistant Examiner*—Jose M. Solis
*Attorney, Agent, or Firm*—Evenson, McKeown, Edwards & Lenahan, P.L.L.C

[57] ABSTRACT

A capacitance detector comprises switches for charging and discharging a sensing part, an integrator constituted by a condenser and an operational amplifier for integrating a charging current or a discharging current which is generated according to the charging and discharging the sensing part, a switch for charging an output voltage of the operational amplifier and for feedbacking an electric charge to the integrator, and a condenser. The capacitance detector can be provided by the operational amplifier having a low response performance and a small output current and no hold sample circuit, thereby a circuit scale of the capacitance type sensor can be made small.

8 Claims, 13 Drawing Sheets

PRESSURE

| No | P₁ | P₂ | P₃ | P₄ |
|----|----|----|----|----|
| 1  | Z  | H  | L  | Z  |
| 2  | H  | Z  | L  | Z  |
| 3  | H  | H  | Z  | L  |
| 4  | H  | H  | L  | Z  |
| 5  | L  | L  | Z  | H  |
| 6  | Z  | H  | Z  | L  |
| 7  | Z  | L  | Z  | H  |
| 8  | H  | H  | Z  | L  |
| 9  | L  | L  | H  | Z  |
| 10 | L  | L  | Z  | H  |
| 11 | L  | Z  | H  | Z  |
| 12 | Z  | L  | H  | Z  |

H : 5V
L : 0V
Z : HIGH IMPEDANCE

CAPACITANCE TYPE SENSOR DEVICE

BACKGROUND OF THE INVENTION

1. Technical Field

The present invention relates to a capacitance type sensor device in which a physical amount is detected in accordance with a change of an electrostatic capacitance.

2. Prior Art

As a conventional capacitance type sensor device, a failure diagnosis device having an electrostatic capacitance type sensor device is disclosed, for example in Japanese patent laid-open No. 223,844/1993, in which a capacitance type sensor device linearly detects a sensor capacity.

The above stated conventional capacitance type sensor device is shown in FIG. 2. In FIG. 2, a detector comprises switches 10 and 12, a sensing part 11, a condenser 13, an operational amplifier 14, and a sample hold circuit 15.

An electrostatic capacitance of the sensing part 11 is charged and discharged by the switch 10, and this current flowing charge and discharge current is charged by an integrator having a reset function, this integrator comprises the switch 12, the condenser 13, and the operational amplifier Accordingly, as shown in FIG. 3, a pulse-wise wave-form having a wave height value in response to a capacitance value of the sensing part 11 is obtained as an output of the operational amplifier 14. By sampling the wave height value of this pulse-wise wave-form through the sample hold circuit 15, a change of the electrostatic capacitance is detected.

However, in the conventional capacitance detector, the output of the operational amplifier 14 changes with a pulse-wise wave-form as shown in FIG. 3. As a result, a very fast response performance and a large output current is required in the operational amplifier 14.

Further, since the output of the operational amplifier 14 is the pulse-wise wave-form, the sample hold circuit 15 is provided at a latter stage, thereby it is necessary to convert to a continuous signal. Accordingly, in the above stated conventional technique capacitance detector, a large circuit scale is needed.

Further, in a case that the capacitance detector of the conventional technique is assembled, MOS capacitance is used as the condenser 13 for determining a sensibility of the capacitance detector. However, by a voltage dependency of MOS capacitance, a large non-linear characteristic causes in a relationship between a capacitance value of the sensing part 11 and the output voltage of the capacitance detector.

Further, so as to raise the sensibility of the capacitance detector according to the conventional technique, it requires to make small the capacitance value of the condenser 13.

However, a very large offset capacitance (an electrostatic capacitance part not be changed according to the detected physical amount) exists at the sensing part 11, when the capacitance value of the condenser 13 is made small, a stability performance or a response performance of the operational amplifier 14 becomes low, consequently there is a limitation for rasing the sensibility.

SUMMARY OF THE INVENTION

An object of the present invention is to provide a capacitance type sensor device wherein a linear characteristic is not deteriorated by a voltage dependency of MOS capacitance and further a large sensibility can be realized.

The above stated object of the present invention can be attained by in a capacitance type sensor device in which a physical amount is detected in accordance with a change of an electrostatic capacitance of a sensing part, the capacitance type device comprises means for charging and discharging the electrostatic capacitance, an integration means for integrating a charging current and discharging current generated by the charging and discharging the electrostatic capacitance, a condenser for charging an output voltage of the integration means, and means for feedbacking an electric charge charged in the condenser to the integration means.

Further, the above stated object of the present invention can be attained by in a capacitance type sensor device in which a physical amount is requested in accordance with a detection of an alternative current component according to a change of an electrostatic capacitance of a condenser which is constituted in a sensing part, the capacitance sensor device comprises means for connecting an output voltage to a power supply voltage or a ground voltage in a case that a capacitance value of the condenser is come off a beforehand predetermined capacitance value.

The output voltage continuously changes. As a result, the operational amplifier used for the capacitance detector can have a low speed response performance and can be operated at a small output current. Further, since the output voltage of the capacitance detector continuously changes, it is unnecessary to provide a sample hold circuit.

DESCRIPTION OF THE INVENTION

Figure 1:
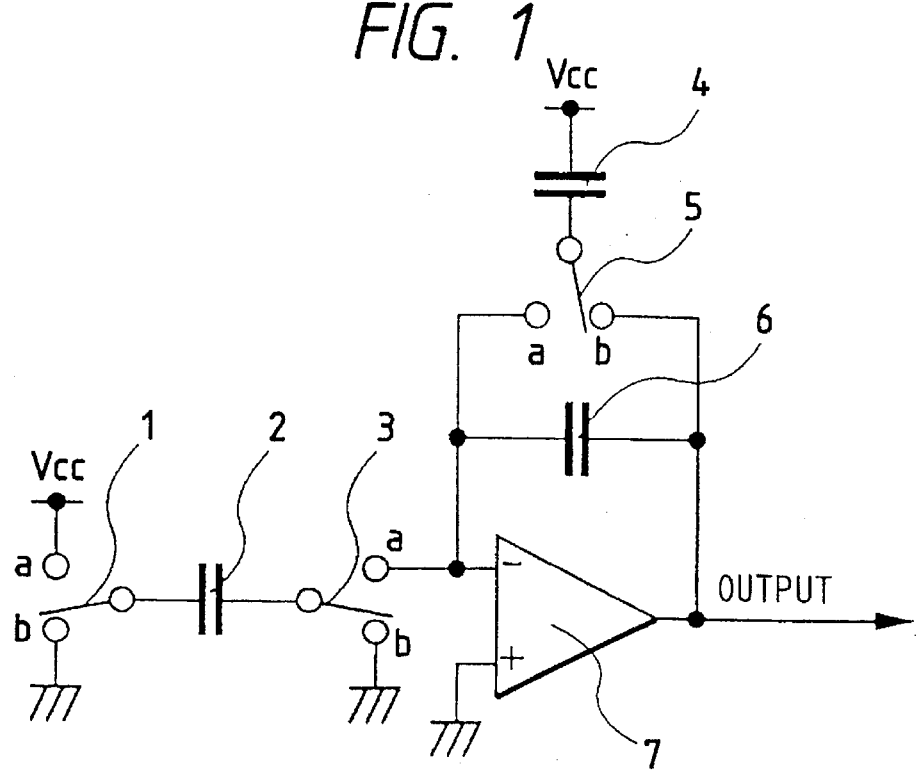
FIG. 1 is a basic circuitry of a capacitance type sensor device according to the present invention.
Figure 2:
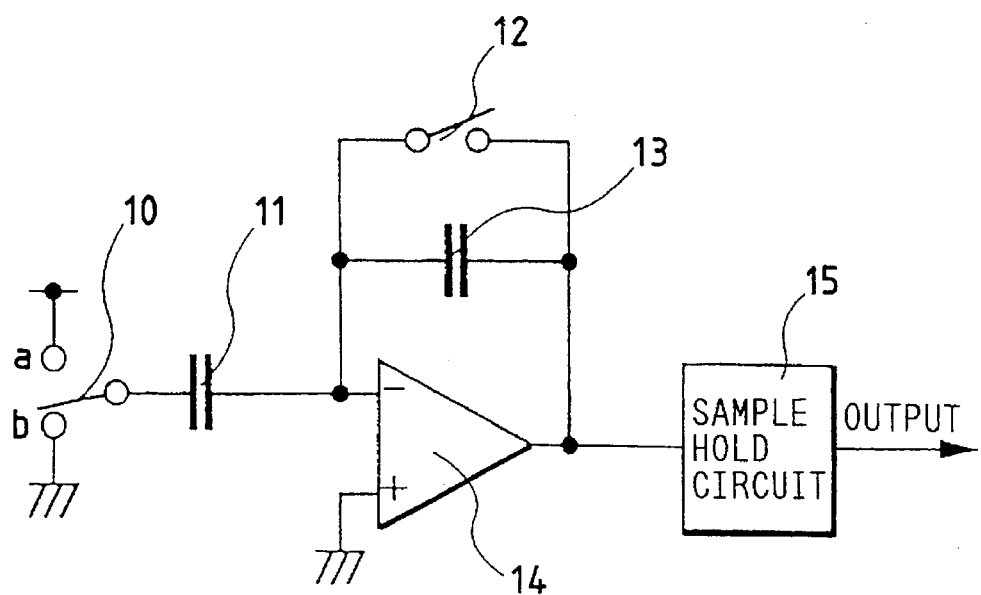
FIG. 2 is a basic circuitry of a capacitance type sensor device according to the conventional technique.
Figure 3:
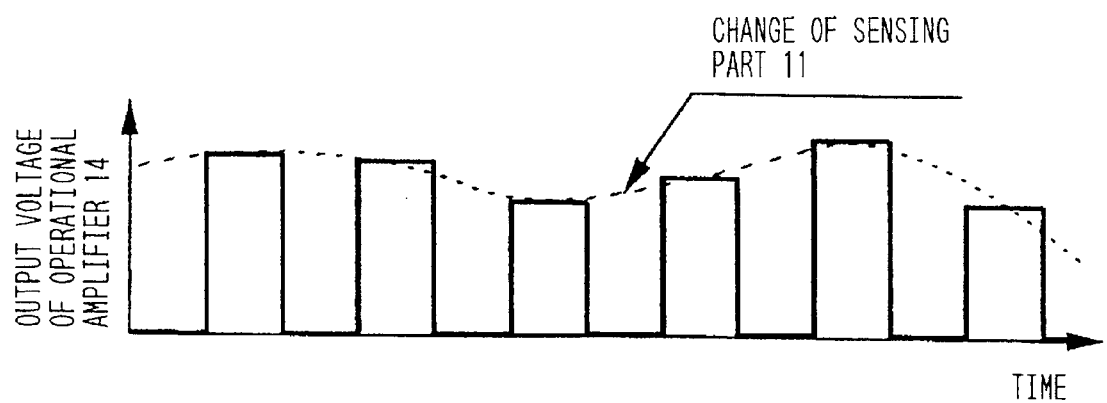
FIG. 3 is an output wave-form view showing an operational amplifier shown in FIG. 2.

FIG. 1 shows a basic circuit of a capacitance detector according to the present invention. A capacitance detector comprises switches 1, 3 and 5, an operational amplifier 7, condensers 4 and 6. This circuit generates an analog voltage in response to a change of a capacitance value of a sensing part 2.

The switches 1, 3 and 5 synchronously operate and alternatively open or close at a side and at b side. Firstly, when the switches 1, 3 and 5 close at b side, the sensing part 2 is discharged and an output voltage of the capacitance detector is charged at the condenser Next, when the switches 1, 3 and 5 close at a side, the sensing part 2 is charged and this charge current flows through the condenser 6, and an electric charge having the same amount of an electric charge charged in the sensing part 2 is additionally charged in the condenser 6.

Further, when the switch 5 closes at a side, the condenser 4 is discharged, and this discharge current is accumulated in the condenser 6. The above stated relationship will be expressed as following:

$$Q_{C6}(n) = Q_{C6}(n-1) + Q_{CS} + Q_{C4}$$

$$-C_6 V_{OUT}(n) = -C_6 V_{OUT}(n-1) + V_{CC} C_S + Q_{CS} + C_4 V_{OUT}(n-1)$$

$Q_{C6}(n)$: charged electric charge amount of condenser 6 of present time $Q_{C6}(n-1)$: charged electric charge amount of condenser 6 of one previous time $Q_{CS}$: charged electric charge amount of sensing part 2

$Q_{C4}$: charged electric charge amount of condenser 4

$V_{OUT}(n)$: output voltage of capacitance detector of present time $V_{OUT}(n-1)$: output voltage of capacitance detector of one previous time $V_{CC}$: supply power voltage $C_s$: capacitance value of sensing part 2 of present time $C_6$: capacitance value of condenser 6

$C_4$: capacitance value of condenser 4

From the above stated relationship, a final value of the output voltage of the capacitance detector is requested, and the final value is expressed by a next following Equation.

$$V_{OUT}(\infty) = -(V_{CC}/C_4) \times C_s \qquad \text{Equation 1}$$

$V_{OUT}(\infty)$: final value of output voltage of capacitance detector

Consequently, it is seen that the final value of the output voltage of the capacitance detector changes in proportional to the capacitance value of the sensing part 2.

Figure 4:
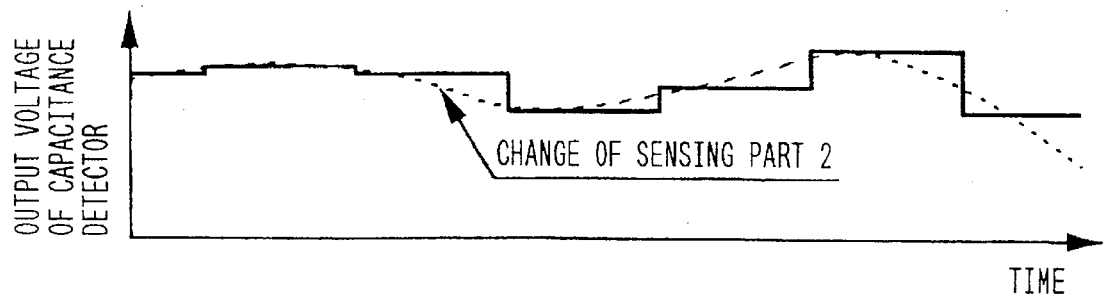
FIG. 4 is an output wave-form view showing a capacitance type sensor device according to the present invention.

Further, in the above stated prior technique the output voltage of the capacitance detector changes in the pulse-wise wave-form, however the output voltage of the capacitance detector according to the present invention does not change in the pulse-wise wave-form but continuously changes as shown in FIG. 4.

Consequently, the operational amplifier used in the capacitance detector can be constituted with a low speed response performance and further can be operated at a small output current. Further, since the output voltage of the capacitance detector continuously changes, a sample hold circuit becomes unnecessary.

Further, a bias voltage can be applied not so as not appear the voltage dependency in the condenser 4 which determines the sensibility of the capacitance detector. Accordingly, even by assembling the capacitance detector it is possible to form to not appear the non-linear characteristic in the relationship between the capacitance value of the sensor capacitance and the output voltage of the capacitance detector.

In FIG. 1, since one end of the condenser 4 is connected to the power supply voltage, a side being connected to the power supply of the condenser 4 is maintained always with the high voltage.

Further, in this capacitance detector since the capacitance value of the condenser 4 is made small, the sensibility can be increased. In other words, the sensibility of this capacitance detector does not depend on the capacitance value of the condenser 6.

Accordingly, the response performance and the stability performance of the operational amplifier 7 can be attained by making large the capacitance value of the condenser 6, thereby even a large offset capacitance exists in the sensing part 2, the response performance and the stability performance of the operational amplifier 7 do not lower.

Further, the sensibility of this capacitance detector can be raised by making small the capacitance value of the condenser 4. Because that the response performance and the stability performance of the operational amplifier 7 are not low, by making large the capacitance value of the condenser 6 the sensibility of this capacitance detector can be raised.

Accordingly, in comparison with the sensibility of the capacitance detector in the conventional technique, the sensibility of the capacitance detector according to the present invention can be increased more than five times.

Figure 5:
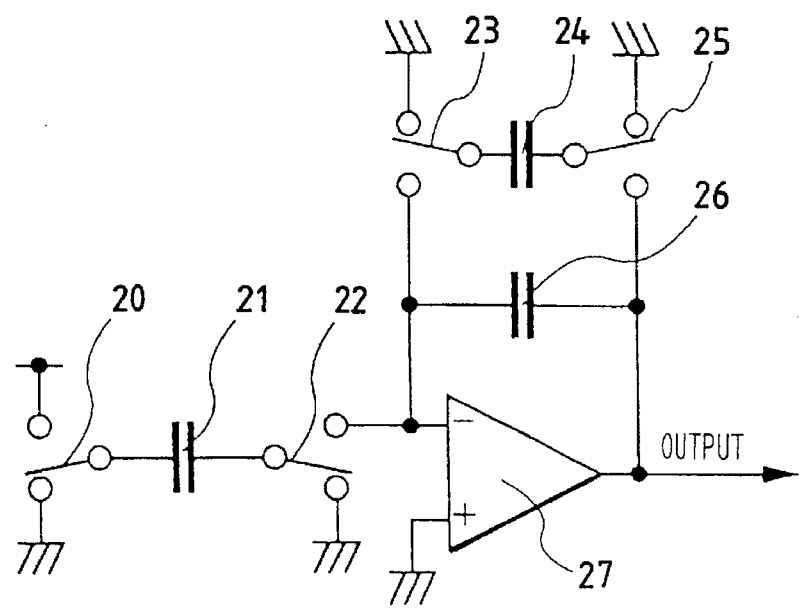
FIG. 5 is a basic circuitry of a modified embodiment of a capacitance type sensor device according to the present invention.

Further, as a modified embodiment of this capacitance detector there is a construction shown in FIG. 5.

This capacitance detector comprises switches 20 and 22 for charging and discharging a sensing part 21, a condenser 26 for constituting an integrator, an operational amplifier 27, switches 23 and 25 for feedbacking the charging electric charge to the integrator by charging the output voltage of the capacitance detector, and a condenser 24. This capacitance detector has similar characteristics of the former stated capacitance detector.

In advance of the explanation of the embodiment according to the present invention, the outline of the capacitance type sensor will be explained referring to FIG. 6 and FIG. 7.

Figure 6:
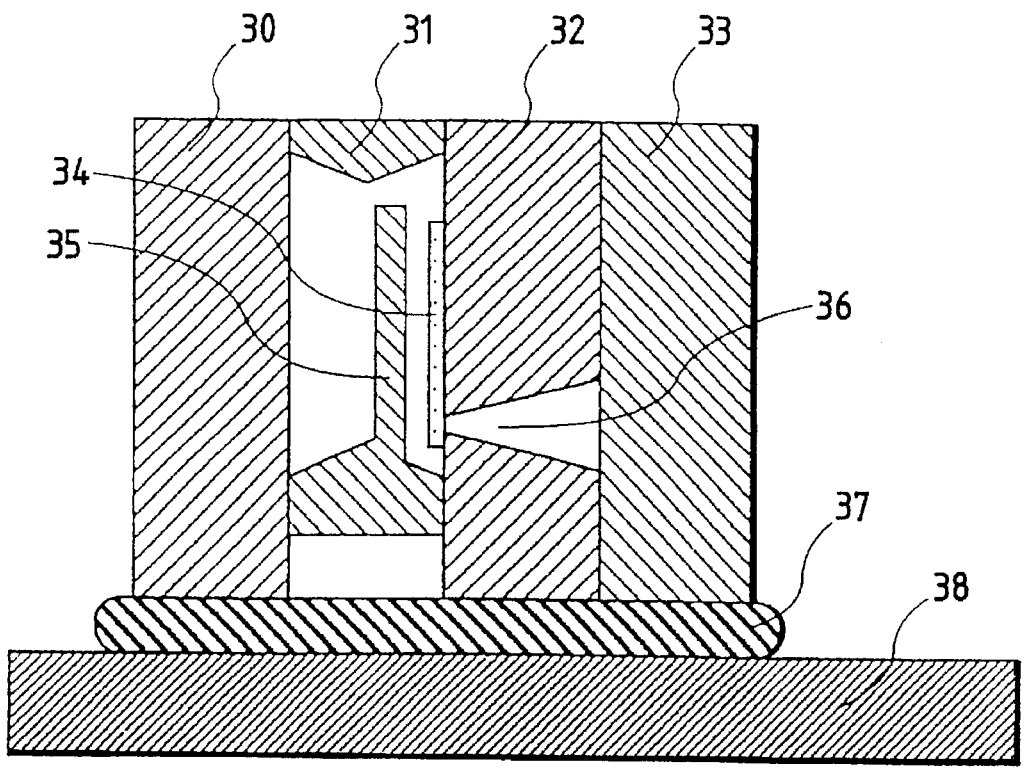
FIG. 6 is a cross-sectional view showing a capacitance type accelerometer device.
Figure 7:
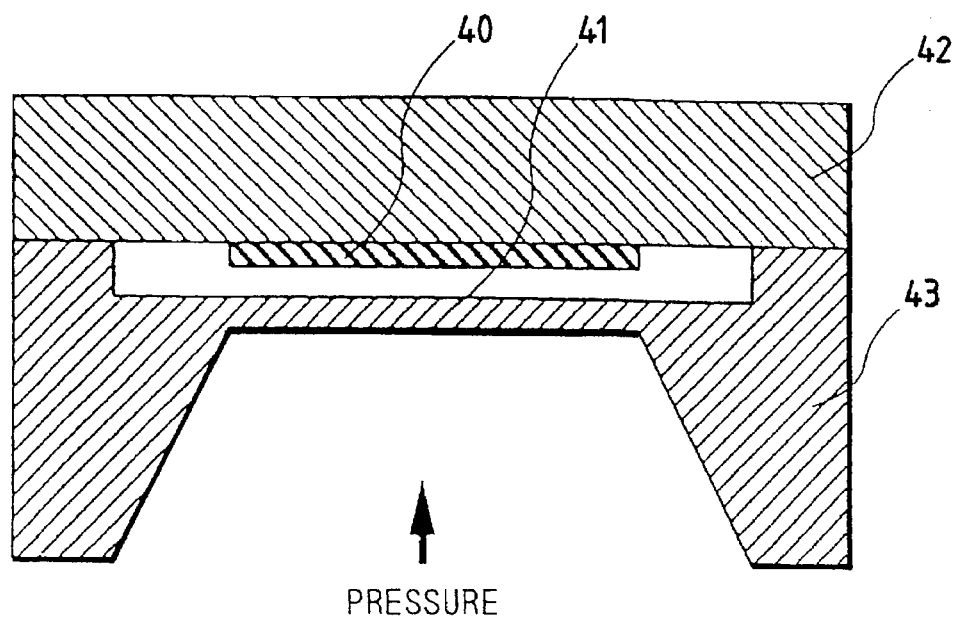
FIG. 7 is a cross-sectional view showing a capacitance type pressure sensor device.

FIG. 6 shows a cross-sectional view of a capacitance type accelerometer, and FIG. 7 shows a cross-sectional view of a capacitance type pressure sensor.

First of all, the construction of a capacitance type accelerometer will be explained referring to FIG. 6. This capacitance type accelerometer has a four-layers structure which comprises a glass layer 30, a silicon layer 31, a glass layer 32, and a silicon layer 33.

On the silicon layer 31 a cantilever portion 35 is formed according to an etching processing. Further, in the glass layer 32 a fixed electrode 34 is formed to oppose with the cantilever portion 35 and this fixed electrode 34 is connected to the silicon layer 33 through a through-hole 36.

In this capacitance type accelerometer, when the acceleration works on the right and left direction of the drawing, the cantilever portion 35 moves toward the right and left direction of the drawing due to an inertia force, then a gap between the fixed electrode 34 and the cantilever portion 35 changes.

Since when the gap between the cantilever portion 35 and the fixed electrode 34 changes, the electrostatic capacitance between the cantilever portion 35 and the fixed electrode 34 changes. Accordingly, the acceleration is detected in accordance with the detection of the change of the electrostatic capacitance.

Further, this capacitance type accelerometer is fixed to a metal board 38 by the adhesion using an insulated adhesive agent 37 (a silicone rubber, an epoxy adhesive agent etc.).

In this time, the metal board 38 is grounded so as to reduce a parasitic capacitance between the silicon layer 31 and the silicon layer 33. Further, so as to reduce a parasitic capacitance between the silicon layer 31 and the metal board 38, an interval between the silicon layer 31 and the metal board 38 is formed to broaden.

Next, a construction of a capacitance type pressure sensor will be explained referring to FIG. 7. This pressure sensor has a double-layer structure which comprises a glass layer 42 and a silicon layer 43. A thin film portion 41 is formed on the silicon layer 43 and a fixed electrode 40 is formed on the glass layer 42 so as to oppose with the thin film portion 41.

Accordingly, by working the pressure force on the thin film portion 41, this thin film portion 41 moves toward the up and down direction of the drawing.

By moving the thin film portion 41 toward the up and down direction, a gap between the thin film portion 41 and the fixed electrode 40 changes, and then the electrostatic capacitance between the thin film portion 41 and the fixed electrode 40 changes. Accordingly, the pressure force added to the thin film portion 41 is detected in accordance with the detection of the change of the electrostatic capacitance.

Figure 8:
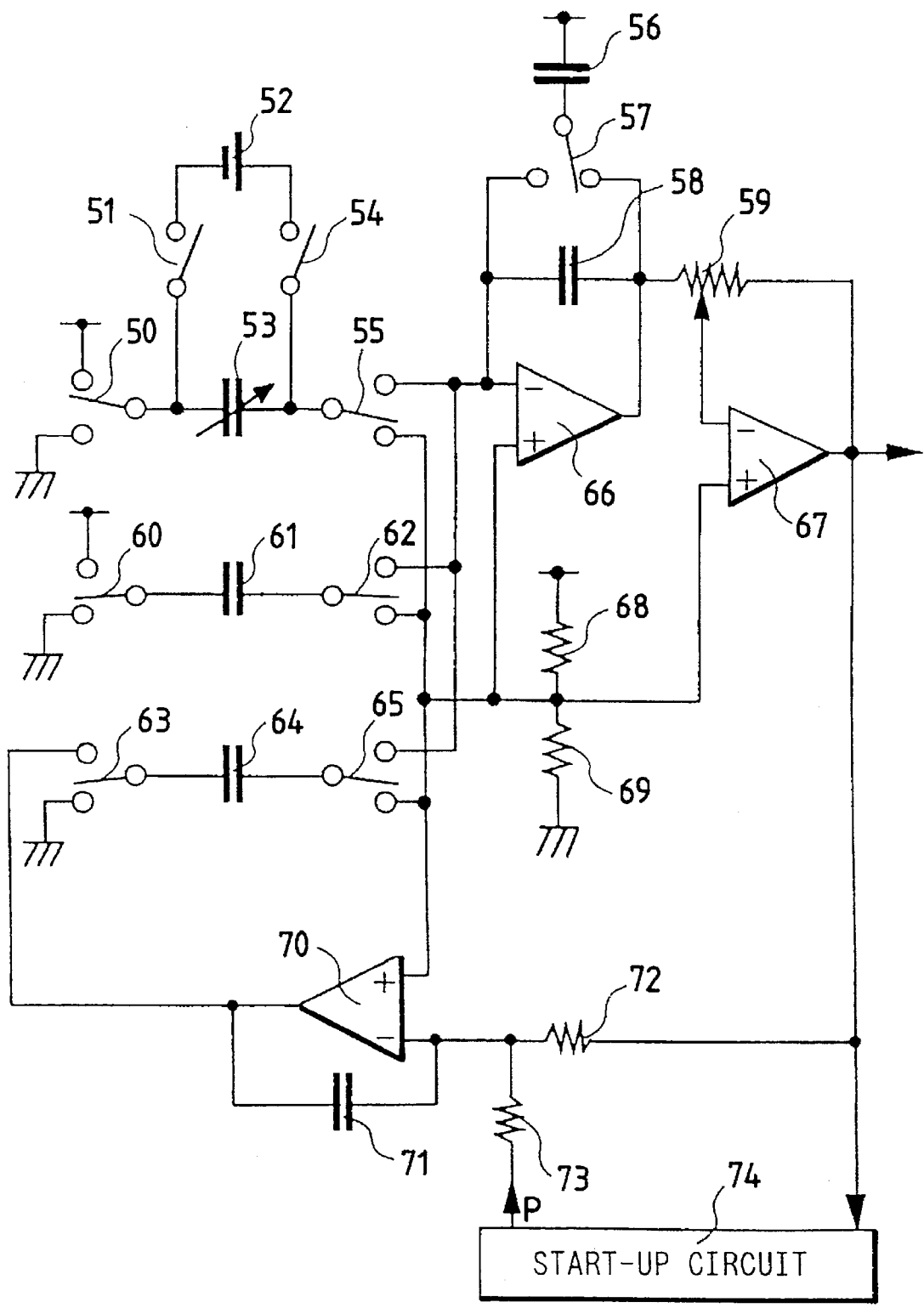
FIG. 8 is a constructive view of a first embodiment of a capacitance type sensor device according to the present invention.

Next, a capacitance type sensor device of a first embodiment according to the present invention will be explained referring to FIG. 8. FIG. 8 shows a construction of a capacitance type sensor device of a first embodiment according to the present invention.

The capacitance detector comprises a sensing part 53, switches 50, 55 and 57 for constituting a basic circuit of the capacitance detection, condensers 56 and 58, an operational amplifier 66, switches 60, 62, 63 and 65 for adjusting an offset of the capacitance detector, a variable resistor 59 for constituting a gain variable amplifier which adjusts a sensibility of an output signal, an operational amplifier 67, resistors 68 and 69 for generating a standard voltage, a resistor 72 for constituting an integrator which unifies a direct current level of the output voltage by feedbacking a direct component of the output voltage, a condenser 71, an operational amplifier 70, a resistor 73 for reaching the direct current level of the output voltage to a standard value at high speed during the start-up time, a start-up circuit 74, switches 51 and 54 for practicing a diagnosis of the sensor, and a battery 52.

At first, the capacitance detection operation will be explained. This capacitance detector is a capacitance detector in which in the basic circuit constituted by the switches 50, 55 and 57, the condensers 56 and 58 and the operational amplifier 66, an offset of the output voltage is enable to change by the addition of the switches 60, 62, 63 and 65 and the condensers 61 and 64.

In this capacitance detector, since the circuit is formed so as to subtract a large offset capacitance of a sensing part 53, by operating the switch 50 and the switches 60 and 63 with the reversal phase, the voltage in proportional to the difference between the sensing part 53 and the condensers 61 and 64 is obtained as the output of the capacitance detector.

Further, the voltage for charging and discharging at a side of the switch 63 is changed, even the parasitic capacitance of the sensing part 53 etc. changes, the offset value of the output voltage is able to adjust at a suitable voltage.

Further, in a case in which a large offset capacitance (an electrostatic capacitance part being not changed by a physical amount to be detected) exists at the sensing part 53, by adjusting the voltage for charging and discharging of the condenser 64, even when the sensibility the capacitance detector raises, since the output voltage of the capacitance detector does not saturate, the sensibility of the capacitance detector can be made large.

Next, a diagnosis operation will be explained. In a crash sensor for detecting the crash of a vehicle and so on, the diagnosis of the operation of the sensing part 53 is needed, as a result in this capacitance detector a function for diagnosing the operation of the sensing part 53 is added.

In this capacitance detector, a spare time exists in an interval of the charging and discharging for the electrostatic capacitance of the sensing part 53, in this spare time by short-circuiting the switches 51 and 54 the voltage supplied from the battery 52 is added to both ends of the sensing part 53.

By the virtue of this voltage, the electrostatic force generates between the electrodes of the sensing part 53, by this electrostatic force the capacitance value of the sensing part 53 changes. Since this change is reflected to the output voltage by the capacitance detector, the diagnosis of the sensor is performed in accordance with the detection of this change.

Next, the operation for making constant the direct current level of the output voltage in this capacitance detector will be explained. The output of the capacitance detector integrates through the integrator which is comprised of an operational amplifier 70, a resistor 72 and a condenser 71.

The voltage for charging and discharging the condenser 64 is changed by the output voltage of this integrator, thereby the direct current level of the output voltage of the capacitance detector is unified.

The above operation is carried out so as to reduce the sensibility of the capacitance detector which is changed by the voltage dependency of the condenser 56 for determining the sensibility of the capacitance detector, and then the voltage of both ends of the condenser 56 is made always constant.

By carrying out the above operation, the direct current output of the capacitance type sensor which utilized this capacitance detector is cut, however in the sensor for detecting the crash of the vehicle such as a crash sensor, since the direct current component is unnecessary, such a sensor can be adopted for use in the above stated purpose.

Figure 9:
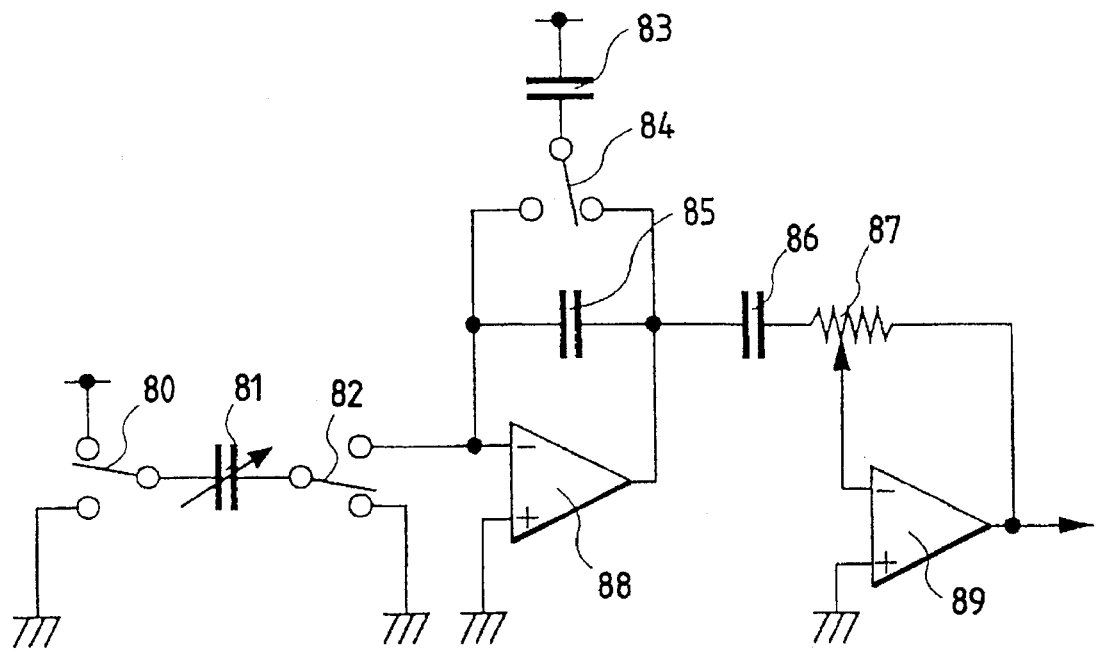
FIG. 9 is a view showing a method of cutting a direct current component of a conventional crash sensor.

In the crash sensor, so as to perform the removal of the direct current draft and the omission of the offset adjustment of the sensor, a method for cutting the direct current component has known from the past. A method for inserting in serial HPF (High Pass Filter) is known, as shown in FIG. 9.

The above stated method and the method explained by FIG. 8 according to the present invention are compared, and thereby the merits obtained by the present invention will be explained.

First of all, a construction shown in FIG. 9 will be explained. This construction comprised of switches 80 and 82 for charging and discharging a sensing part 81, condensers 83 and 85 for constituting the capacitance detector, a switch 84, an operational amplifier 88, a condenser 86 for constituting HPF and a gain adjusting circuit, a variable resistor 87, and an operational amplifier 89.

With the above construction, both the output of the sensor during the short-circuit or the breaking of wire of the sensing part 81 and the output of the sensor during the normal condition do not change. The direct current levels in both conditions of the outputs of the sensor are equal.

In other words, with this construction, the breaking of wire or the short-circuit in the sensing part 81 can not be judged.

Besides, in the capacitance detector according to the present invention as shown in FIG. 8, when the capacitance value of the sensing part 53 is come off the capacitance value, which has the value between the capacitance value of the condenser 61 and the sum of the capacitance values of the condenser 61 and the condenser 64, the output voltage is fixed to the supply power voltage or the ground voltage.

Further, the sensing part 53 is made the breaking of wire or the shot-circuit, since the capacitance value of the sensor capacitance become zero or infinity, the capacitance value of the sensing part 53 is come off the capacitance value, which has the value between the capacitance value of the condenser 61 and the sum of the capacitance values of the condenser 61 and the condenser 64, the output voltage is fixed to the supply power voltage or the ground voltage.

In other words, the abnormality of the sensing part 53 can be detected in accordance with the confirmation of the fixing of the output voltage to the supply power voltage or to the ground voltage.

Next, the start-up circuit 74 will be explained. As stated in above, the integrator is used so as to make constant the direct current level of the output voltage of the capacitance detector.

However, the time is required to reach the direct current level of the output voltage of the capacitance detector at a predetermined constant value after the integrator has charged. This time has the possibility for delaying the start-up time of this capacitance detector. Consequently, the resistor 73 and the start-up circuit 74 are provided so as to shorten this start-up time.

Figure 10:
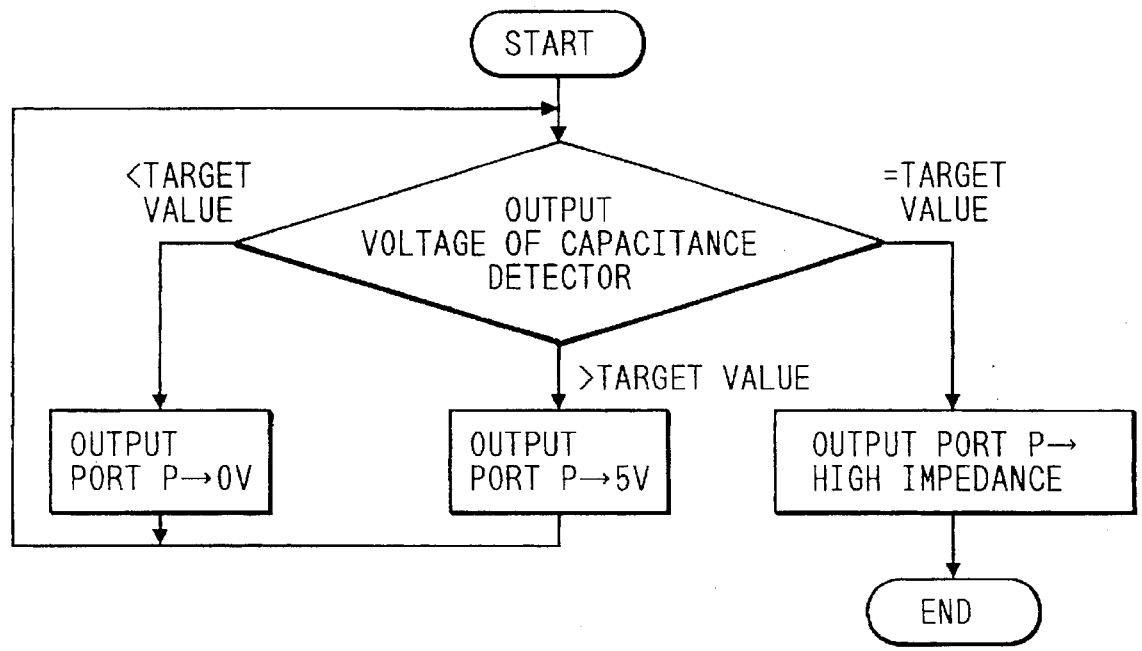
FIG. 10 is an operational flow chart of a start-up circuit.

First of all, the operation of the start-up circuit 74 will be explained referring to FIG. 10. FIG. 10 shows an operation flow chart of the start-up circuit 74.

The start-up circuit 74 operates only during the power supply throw-in time and judges the output voltage of the capacitance detector. When the output voltage is smaller than the target value the voltage of an output port P is made to have 0 V, and when the output voltage is larger than the target value the voltage of the output port P is made to have 5 V, respectively.

Therefore, by abruptly charging and discharging the integrator which is connected through the resistor 73, the output voltage of the capacitance detector is reached to the target value at a short time. When the output voltage of the capacitance detector is reached to the target value, at the same time the output port P is made a high impedance, and the processing is finished.

Further, in the apparatus using a microcomputer, a driving circuit of the resistor 73 can be easily constituted by utilizing the above microcomputer.

Figure 11:
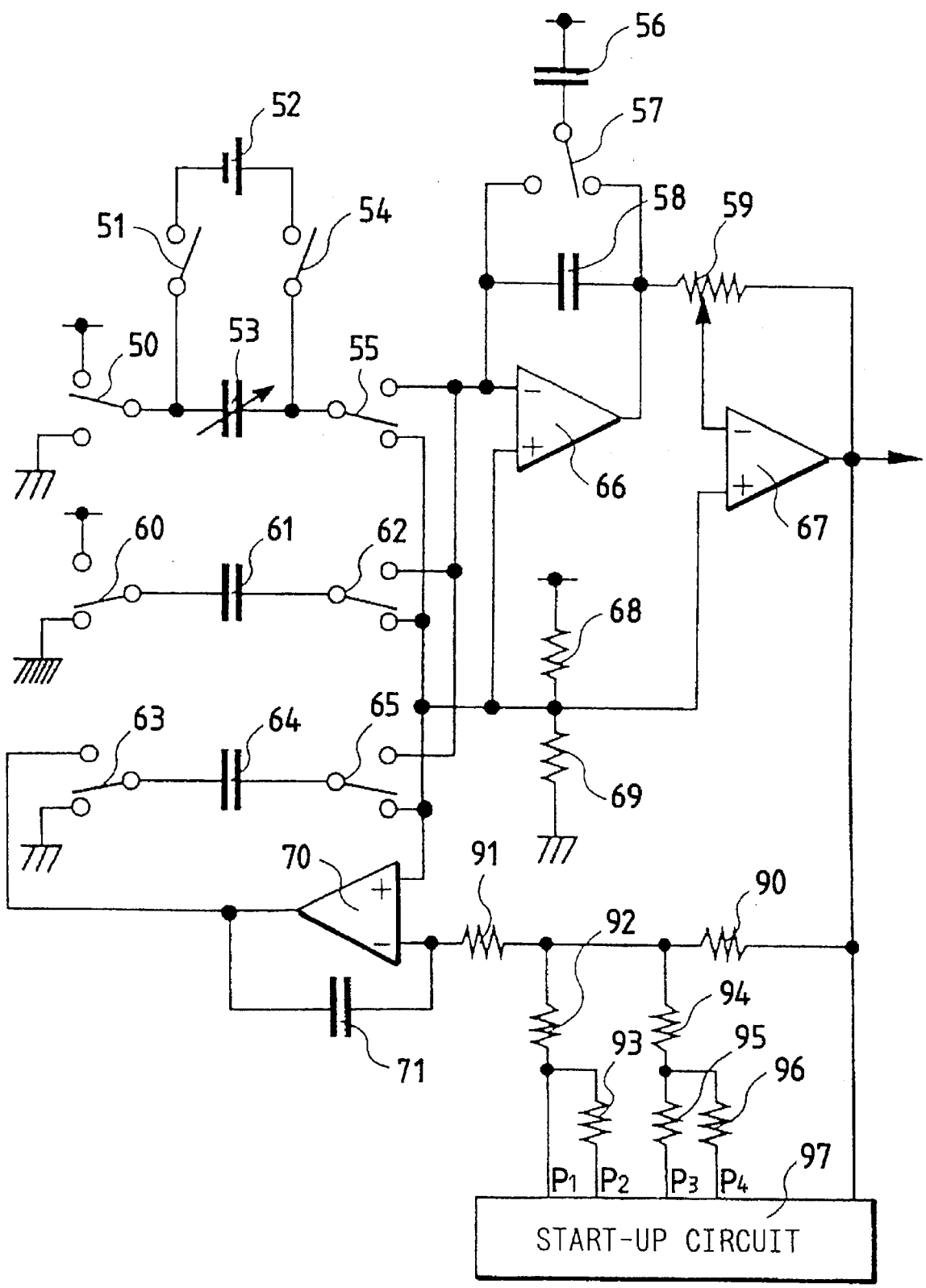
FIG. 11 is a constructive view of a second embodiment of a capacitance type sensor device according to the present invention.
Figures 12, 13:
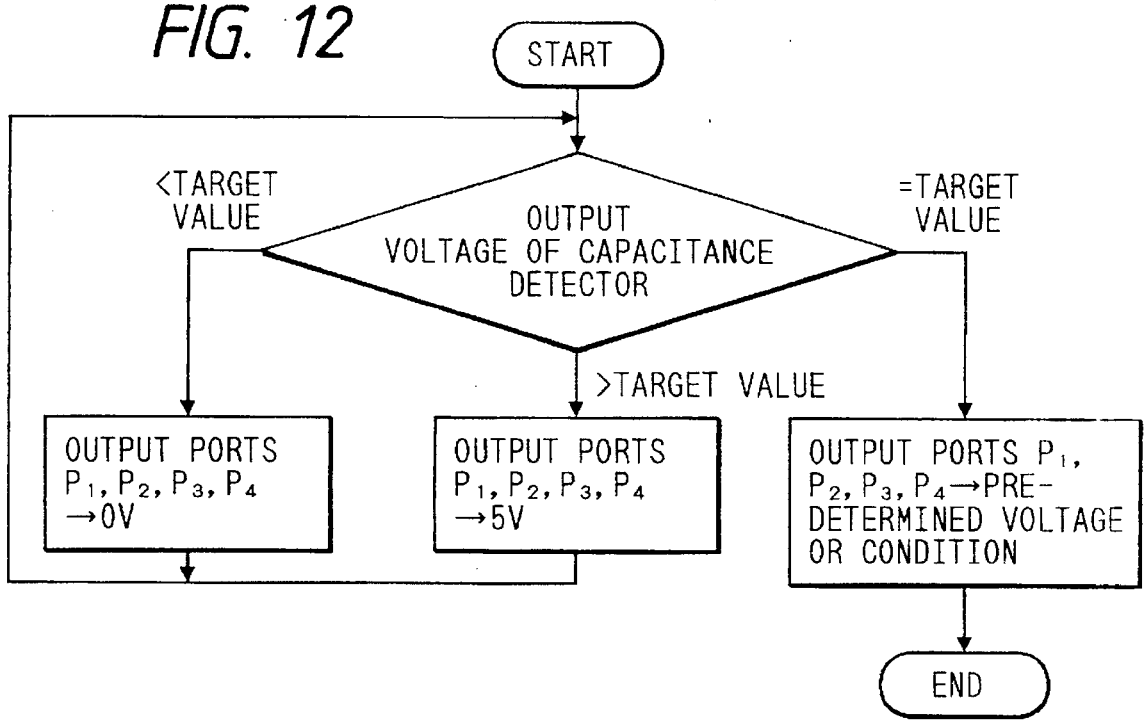
FIG. 12 is an operational flow chart of a start-up circuit.
FIG. 13 is a view showing a combination of output voltages of Output ports of the start-up circuit.

Next, a second embodiment of a capacitance detector of a capacitance type sensor according to the present invention will be explained referring to FIG. 11 and FIG. 12. FIG. 11 is a constructive view showing the second embodiment of the capacitance detector of the capacitance type sensor according to the present invention and FIG. 12 shows an operation flow chart of a start-up circuit 97.

This capacitance detector of the second embodiment is substantially same that of the first embodiment. However, this capacitance detector comprises an attenuator comprised of resistors 90, 91, 92, 93, 94, 95 and 96 and the start-up circuit 97 having a different construction.

Since this capacitance detector operates to make constant the direct current level of the output voltage, the direct current and the low frequency component close to the direct current are cut off.

However, the attenuator is provided on this capacitance detector, this capacitance detector can detect the frequency component nearly close to the direct current in comparison with the first embodiment of the capacitance detector.

Next, the operation of the start-up circuit 97 will be explained referring to FIG. 12. The start-up circuit 97 operates only during the power supply throw-in time and judges the output voltage of the capacitance detector.

When the output voltage is smaller than the target value, the voltages of output ports P1, P2, P3 and P4 are made to respectively have 0 V, and when the output voltage is larger than the target value, the voltages of output ports P1, P2, P3 and P4 are made to respectively have 5 V.

Thereby, by abruptly charging and discharging the integrator, the output voltage of the capacitance detector is allowed to come near the target value at a short time.

When the output voltage of the capacitance detector reaches to the target value and at the same time a beforehand predetermined voltage level is outputted to each of the output ports P1, P2, P3 and P4, as a result the processing is finished.

Herein, at the processing finish time, the voltage level (0 V or the power supply voltage 5 V) for outputting to each of the output ports P1, P2, P3 and P4 is set such that the direct current level of the output voltage of the capacitance detector is nearest close the target value.

The above function is carried out by the reasons in which due to the scattering of the resistors 90, 91, 92, 93, 94, 95 and 96 for constituting the attenuator and the offset voltage of the operational amplifier and so on, the direct current level of the output voltage of the capacitance detector is shifted with the target value and such a shift is adjusted.

Further, the combinations for the voltage level for outputting to each of the output ports P1, P2, P3 and P4 are twelve kinds as shown in FIG. 13, and these settings are automatically stored in a memory device which is provided in an interior portion of the start-up circuit 97 when the power supply is thrown in the start-up circuit 97 at first time.

Figure 14:
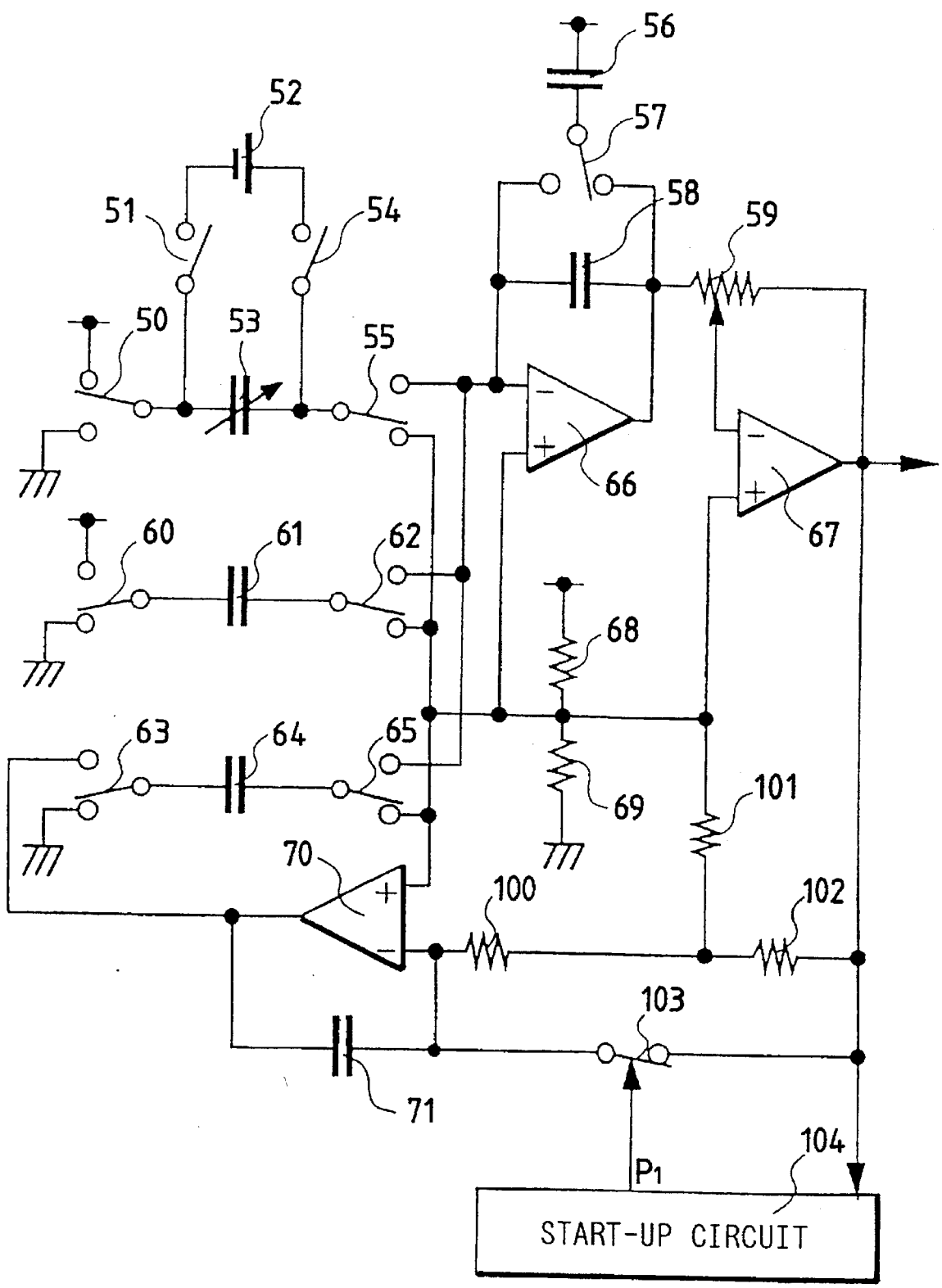
FIG. 14 is a constructive view of a third embodiment of a capacitance type sensor device according to the present invention.

Next, a third embodiment of a capacitance detector of a capacitance type sensor according to the present invention will be explained referring to FIG. 14. FIG. 14 is a constructive view showing the third embodiment of the capacitance detector of the capacitance type sensor according to the present invention.

This capacitance detector of the third embodiment is substantially same that of the first embodiment. However, this capacitance detector comprises an attenuator comprised of resistors 100, 101 and 102, a switch 103 for short circuiting the resistors 100 and 102 and a start-up circuit 104 having a different construction.

The start-up circuit 104 of this third embodiment operates during the power supply throw-in time and by short circuiting the switch 103 at a predetermined time or until the output voltage of the capacitance detector reaches to the target value and then the output voltage of the capacitance detector works to reach to the target value at a short time.

Besides, as the operation of the start-up circuit 104, when the output voltage of the capacitance detector is zero at more than a predetermined time or is fixed to the power supply voltage, the switch 104 is operated to the short-circuit, even during the power supply throw-in time the output voltage of the capacitance detector can reach to the target value at the short time.

Figure 16:
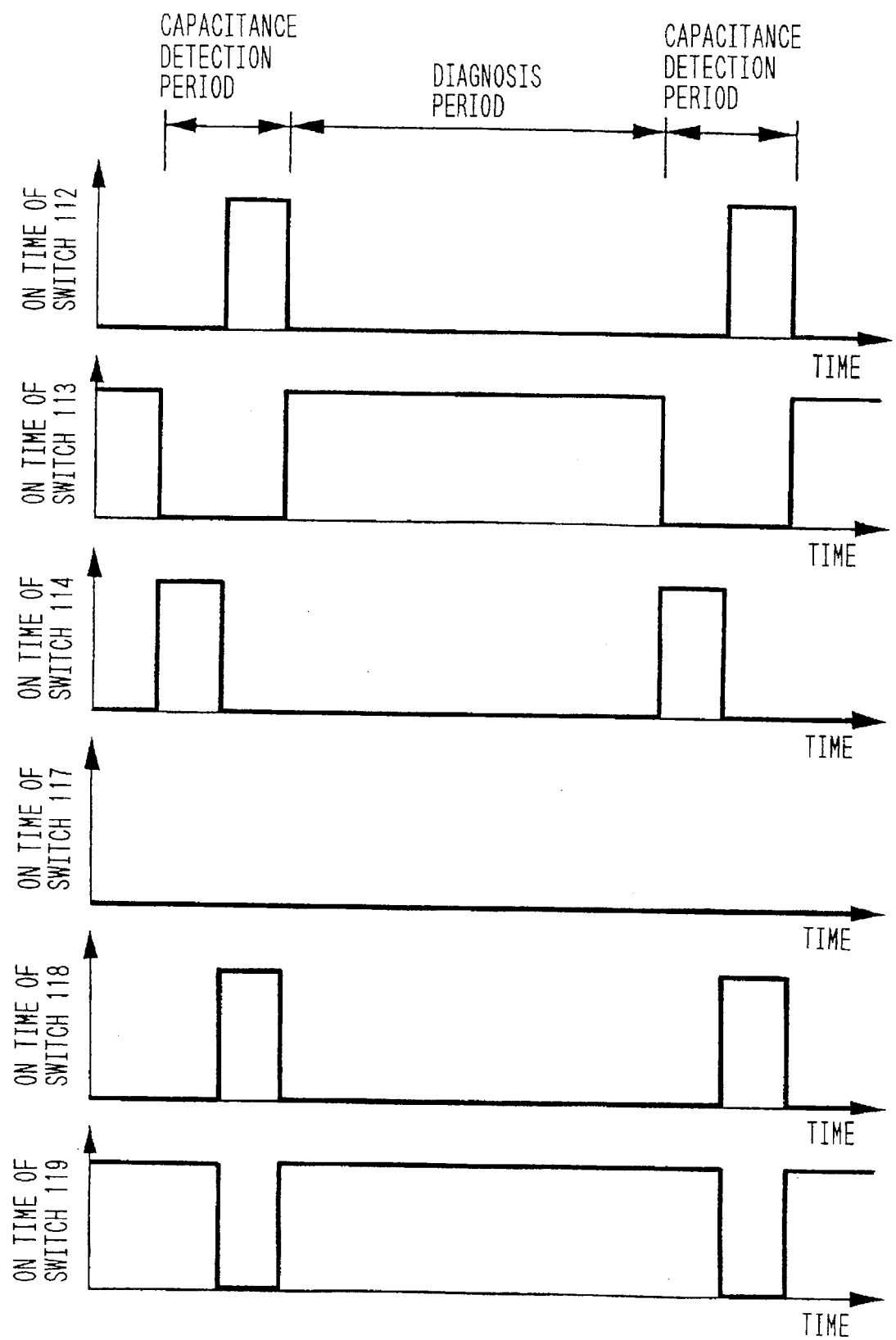
FIG. 16 is a view showing operational sequences of switches 112, 113, 114, 117, 118 and 119 during a non-diagnosis time.
Figure 17:
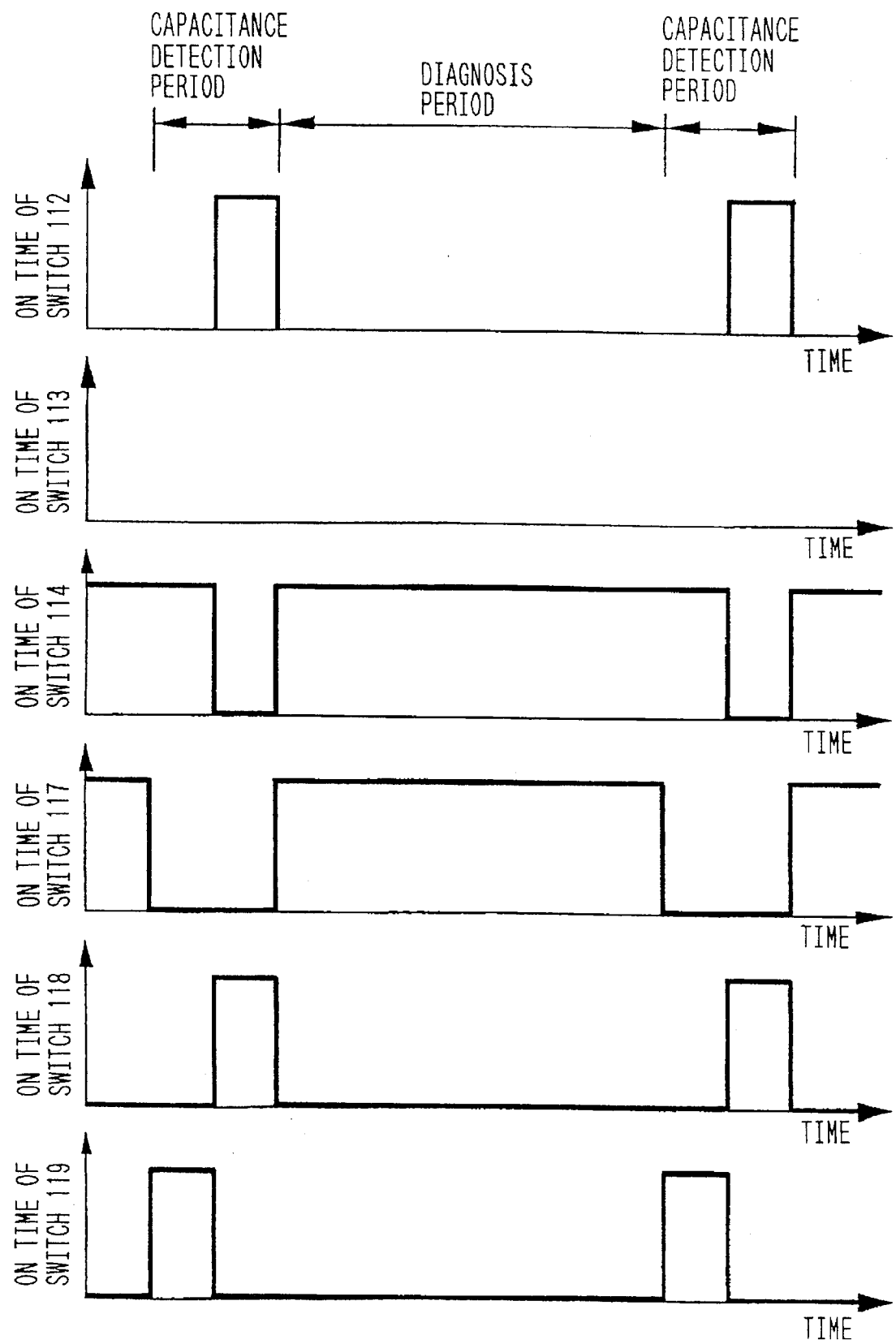
FIG. 17 is a view showing operational sequences of switches 112, 113, 114, 117, 118 and 119 during a diagnosis time.

Next, a fourth embodiment of a capacitance detector of a capacitance type sensor according to the present invention will be explained referring to FIG. 15, FIG. 16 and FIG. 17.

Figure 15:
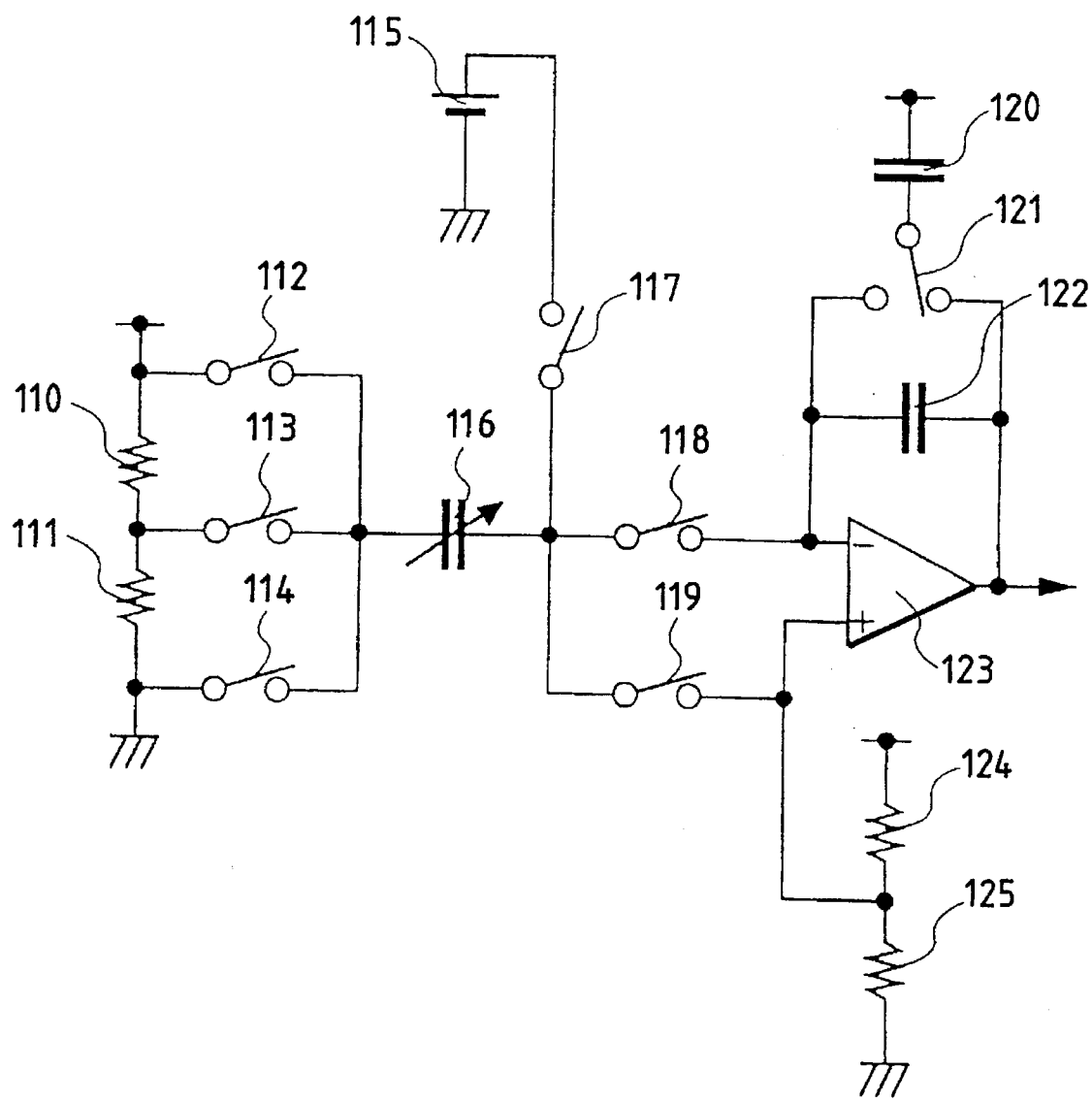
FIG. 15 is a constructive view of a fourth embodiment of a capacitance type sensor device according to the present invention.

FIG. 15 is a constructive view showing the fourth embodiment of the capacitance type sensor device according to the present invention. FIG. 16 is an operation sequence showing a non-diagnosis time of switches 112, 113, 114, 117, 118 and 119. FIG. 17 is an operation sequence showing a diagnosis time of switches 112, 113, 114, 117, 118 and 119.

This capacitance detector of the fourth embodiment comprises resistors 110 and 111 for generating the standard voltage, switches 112, 113 and 114 for charging and discharging a sensing part 116, a switch 117 for applying the voltage so as to generate the electrostatic force for the diagnosis, a battery 115, switches 118, 119 and 121 for constituting the basic circuit of the capacitance detector, condensers 120 and 122, an operational amplifier 123, and resistors 124 and 125 for generating the standard voltage.

First of all, the operation of the non-diagnosis time will be explained referring to FIG. 16. The operation of the capacitance detector is divided into the operation of the capacitance detection period and the operation of the diagnosis period.

In the capacitance detecting period, by opening and closing the switches 112, 114, 118 and 119, the sensing part 116 is charged and discharged. The charging period of the charging current and discharging current to the condenser 122 corresponds to the period for detecting the sensor capacitance.

In the diagnosis period during the non-diagnosis time, by closing the switches 113 and 119, the voltage of both ends of the sensing part 116 is made to have 0 V and the electrostatic force is made not work between the electrodes of the sensing part 116.

As a matter of course, when the electrostatic force works to between the electrodes of the sensing part 116, due to this electrostatic force the error in the capacitance type sensor occurs.

Next, the operation during the diagnosis time will be explained referring to FIG. 17. The operation during the capacitance detection period is similar to that of the non-diagnosis time.

In the diagnosis period during the diagnosis time, by closing the switches 114 and 117, the voltage which is supplied from the battery 115 is applied to both ends of the sensing part 116, and the electrostatic force is generated between the electrodes of the sensing part 116.

By this electrostatic force, the capacitance value of the sensing part 116 changes, and in accordance with the detection of this capacitance value the sensor can be diagnosed.

Figure 18:
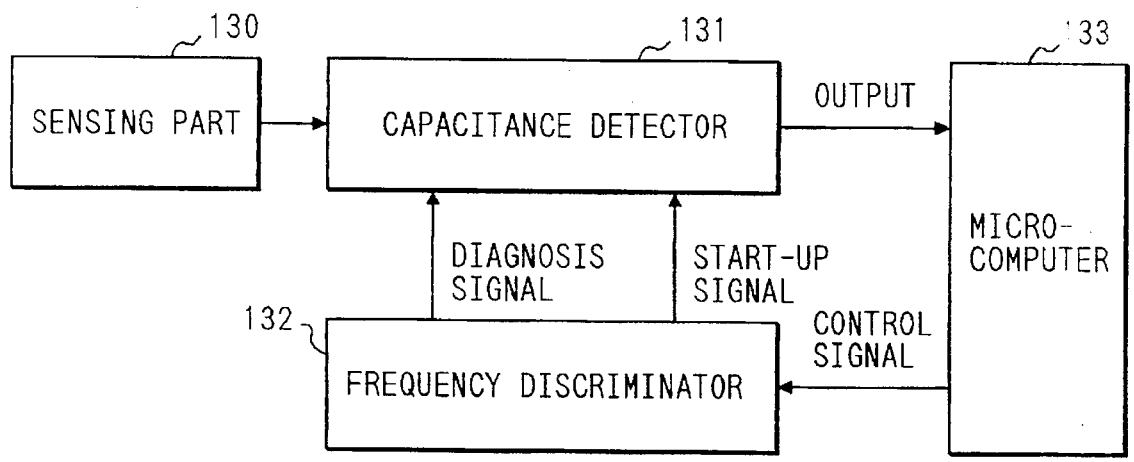
FIG. 18 is a view showing a controlling example according to an outside microcomputer during the diagnosis operation and the start-up operation.

Next, one example of a method for controlling the diagnosis operation and the start-up operation through an outside microcomputer referring to FIG. 18.

In this example, the electrostatic capacitance of a sensing part 130 is detected by a capacitance detector 131, which has the diagnosis function and the start-up function, and is outputted to a microcomputer 133. The microcomputer 133 is managed according to the practice of the diagnosis operation and the start-up operation by a control signal.

The control signal is divided into a diagnosis signal and a start-up signal by a frequency discriminator 132. In other words, when a pulse-wise signal is sent as the control signal by the microcomputer 133, the diagnosis signal is sent to the capacitance detector 131 by the frequency discriminator 132.

When a signal having a low level is sent to the control signal, the start-up signal is sent to the capacitance detector 131 by the frequency discriminator 132, besides when a signal having a high level is sent to the control signal, both diagnosis signal and the start-up signal are made not to output.

Consequently, a number of the output ports of the microcomputer 133 can be reduced and by carrying out the practice of the diagnosis through the pulse-wise signal the practice of the error diagnosis by the malfunction of the microcomputer 133 can be prevented.

Figure 19:
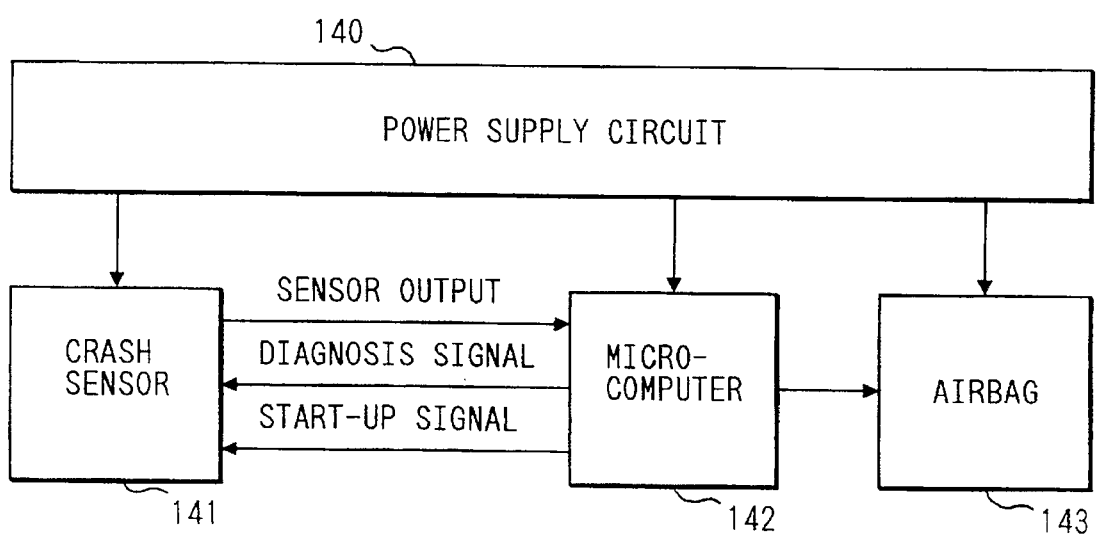
FIG. 19 is a constructive view showing an airbag system used a capacitance detector according to the present invention.

Next, an airbag system, which is an application system using the capacitance detector according to the present invention, will be explained referring to FIG. 19. FIG. 19 is a constructive view showing the airbag system.

This airbag system comprises a crash sensor 141 which combines the capacitance detector according to the present invention with the capacitance type accelerometer (a sensor capacitance), a microcomputer 142 for detecting the crash of the vehicle under the output voltage of the crash sensor 141 and for developing an airbag 143, the airbag 143 for protecting a driver in accordance with the development of the airbag at the crash time, the crash sensor 141, and a power supply circuit 140 for supplying the power to the microcomputer 142 and the airbag 143.

In this airbag system, a very high reliability is required and in especially at the power supply throw-in time the inspection of the abnormality for all components is necessary.

Looking at the features of the present invention again from the above stated views, the present invention has a feature such that in almost components of the capacitance detector even when the short circuit or the failure of the breaking of wire generates the output voltage of the capacitance detector is fixed to the power supply voltage or the ground voltage.

In other words, in the capacitance detector, when the short circuit or the failure of the braking of wire generates in almost components, since the output voltage of the capacitance detector is fixed to the power supply voltage or the ground voltage, the failure of the interior portion of the capacitance detector can be detected in accordance with the observation of the output voltage of the capacitance detector at the power supply throw-in time.

This is caused by the constitution of a feedback loop in accordance with the feedback of the output voltage of the capacitance detector to an input side of the capacitance detector through the integrator, all of the components of the capacitance detector are existed on an interior portion of the feedback loop, the failure in almost components of the capacitance detector is reflected to the output voltage of the capacitance detector.

Next, employing the diagnosis of the capacitance type sensor device using the above stated electrostatic force, a method for diagnosing the capacitance type sensor device of the third embodiment explained by using FIG. 14 will be explained referring to FIG. 20.

Figure 20:
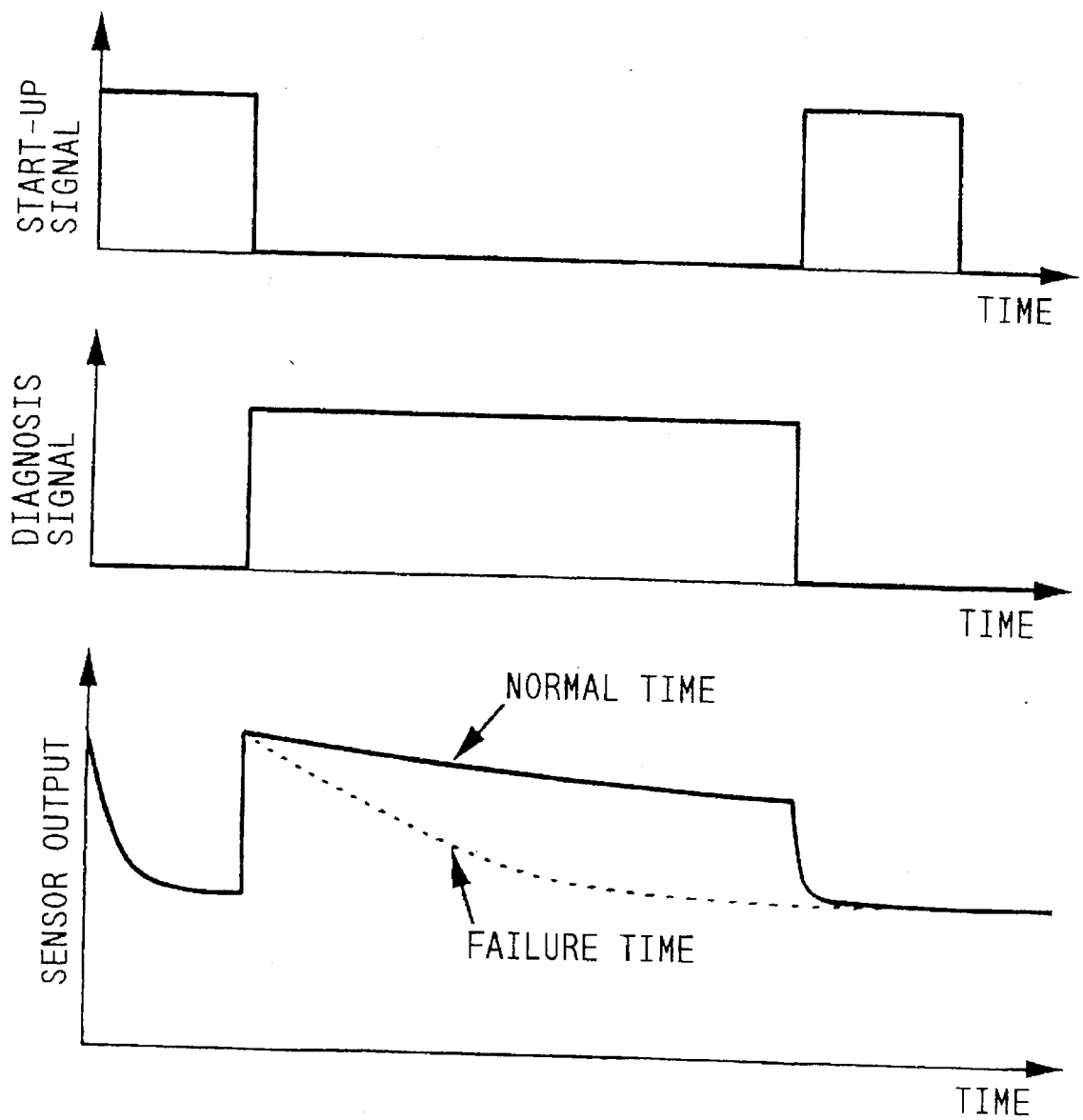
FIG. 20 is a wave-form view showing respective parts during a failure diagnosis time.

Besides, FIG. 20 shows a wave-form of each portion during the failure detection. The short-circuit failure of the resistors 100 and 102 or the detection of the failure of the breaking of wire is attained by the transfer of three conditions.

First of all, a first condition gives the start-up signal, by making the output port P1 at a high level, the switch 103 is made the short-circuit, thereby the output of the capacitance detector is reached to the target value at a short time.

In a second condition, by giving the diagnosis signal the diagnosis of the capacitance type sensor device using the electrostatic force is practiced. In this time, since the capacitance value of the sensing part 53 changes by the electrostatic force, then the output of the capacitance detector changes as shown in FIG. 20.

In this time, the output voltage of the capacitance detector works to make constant the output voltage of the capacitance detector and tries to gradually return back the target value in lapse of time.

Herein, when the short-circuit failure in the resistors 100 and 102 or the failure of the breaking of wire in the condenser 71 has occurred, the time constant of the function for making constant the output voltage of the capacitance detector changes and the change of this time constant is at a high speed as a dot-line shown in FIG. 20.

Through the detection of the change in the time constant, the short-circuit failure in the resistors 100 and 102 or the failure of the breaking of wire in the condenser 71 can be detected.

In a third condition, by giving the start-up signal again, the output port P1 is made the high level and the switch 103 is made the short-circuit, thereby the output voltage of the capacitance detector operates to make stably the target value again.

According to the present invention, the capacitance type sensor device can be constituted by the operational amplifier having the low response performance and the small output current and further by making unnecessary the sample hold circuit, accordingly, the circuit scale of the capacitance sensor can be made small.

We claim:

1. A capacitance type sensor device having a sensing condenser in which a value of an electrostatic capacitance of said sensing condenser changes according to a change of a physical amount, comprising means for repeatedly charging and discharging with a predetermined voltage said sensing condenser;

means for integrating charging current or discharging current generated by the charging and discharging of said sensing condenser for each charging or discharging said sensing condenser;

a reference condenser for charging an output voltage of said integration means; and means for feeding back electric charge in said reference condenser to said integration means.

2. A capacitance type sensor device according to claim 1, further comprising means for holding constant a direct current level of the output voltage of said integration means.

3. A capacitance type sensor device according to claim 2, further comprising means for changing the output voltage by changing capacitance of said sensing condenser in accordance with an electrostatic force, and means for judging whether a failure or not from a time for returning back constant the output voltage changed by said change means in accordance with said hold means.

4. A capacitance type sensor device according to claim 2, wherein the capacitance type sensor device further comprises:
means for reaching at a constant predetermined value at a short time during a power supply start-up the direct current level of the output voltage during a start-up time.

5. A capacitance type sensor device according to claim 1, further comprising means for changing an offset voltage in response to an output of said integration means and an output of an output voltage integration means of a capacitance detector.

6. A capacitance type sensor device according to claim 5, wherein the capacitance type sensor device further comprises:
means for changing an integration constant of said output voltage integration means.

7. A capacitance type accelerometer according to claim 1 wherein the physical amount is acceleration.

8. A capacitance type pressure device according to claim 1 wherein the physical amount is pressure.

* * * * *